US008513859B2

(12) United States Patent
Nikolovski

(10) Patent No.: US 8,513,859 B2
(45) Date of Patent: Aug. 20, 2013

(54) INTERACTIVE PANEL COMPRISING A SUBSTRATE AND AT LEAST TWO PIEZOELECTRIC TRANSDUCTION DEVICES

(75) Inventor: Jean-Pierre Nikolovski, Chatenay-Malabry (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 0 days.

(21) Appl. No.: 13/522,434

(22) PCT Filed: Feb. 1, 2011

(86) PCT No.: PCT/FR2011/050196
§ 371 (c)(1),
(2), (4) Date: Jul. 16, 2012

(87) PCT Pub. No.: WO2011/101569
PCT Pub. Date: Aug. 25, 2011

(65) Prior Publication Data
US 2012/0293046 A1    Nov. 22, 2012

(30) Foreign Application Priority Data
Feb. 17, 2010  (FR) .................................... 10 51128

(51) Int. Cl.
*H01L 41/08*    (2006.01)
(52) U.S. Cl.
USPC ............................ 310/329; 310/331; 310/339
(58) Field of Classification Search
USPC .................................. 310/329, 331, 332, 339
See application file for complete search history.

(56) References Cited

U.S. PATENT DOCUMENTS

| 3,688,251 | A | * | 8/1972 | Morris | 367/188 |
| 4,268,912 | A | | 5/1981 | Congdon | |
| 4,536,862 | A | * | 8/1985 | Sullivan et al. | 367/153 |
| 5,815,466 | A | * | 9/1998 | Erath | 367/160 |
| 6,031,317 | A | * | 2/2000 | Chen | 310/329 |
| 2007/0073502 | A1 | * | 3/2007 | Umeda | 702/96 |
| 2013/0068032 | A1 | * | 3/2013 | Nikolovski | 73/778 |

FOREIGN PATENT DOCUMENTS

| JP | 9 237152 | 9/1997 |
| JP | 10 78485 | 3/1998 |
| WO | 2008 135846 | 11/2008 |

OTHER PUBLICATIONS

International Search Report Issued May 19, 2011 in PCT/FR11/050196 Filed Feb. 1, 2011.

* cited by examiner

Primary Examiner — Mark Budd
(74) Attorney, Agent, or Firm — Oblon, Spivak, McClelland, Maier & Neustadt, L.L.P.

(57) ABSTRACT

An interactive panel including a substrate, wherein a seismic wave is intended to propagate, and at least two piezoelectric transduction devices each including two piezoelectric transducers. Each piezoelectric transducer includes two piezoelectric elements each with two surfaces each covered by an electrode. The four electrodes of each piezoelectric transducer are interconnected to supply, when opposing stresses are applied to the piezoelectric elements of the transducer, an electrical measurement signal that depends on the angle between a main plane and an opposite stress-separation plane. Two piezoelectric transducers of a same device have a same central axis and their respective main planes form a non-zero angle thereinbetween. Each piezoelectric transduction device is attached to the substrate such that movement of the substrate during passage of the seismic wave causes stress on the piezoelectric elements, in opposite directions on either side of the stress-separation plane.

14 Claims, 9 Drawing Sheets

Figure 1:
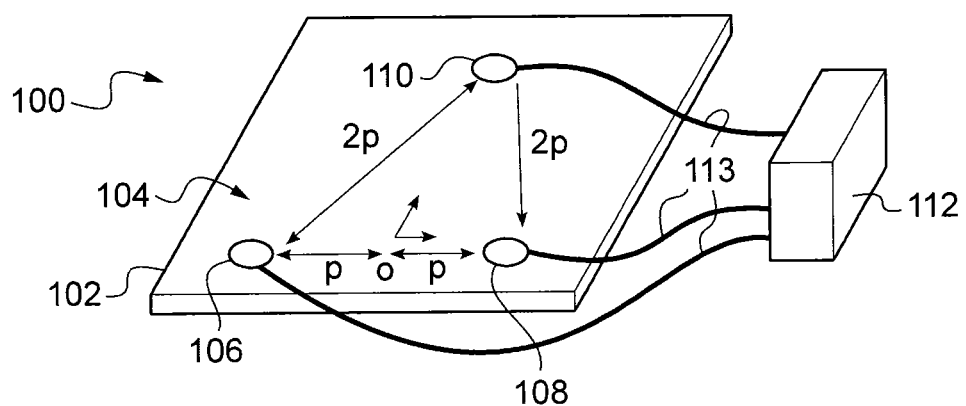

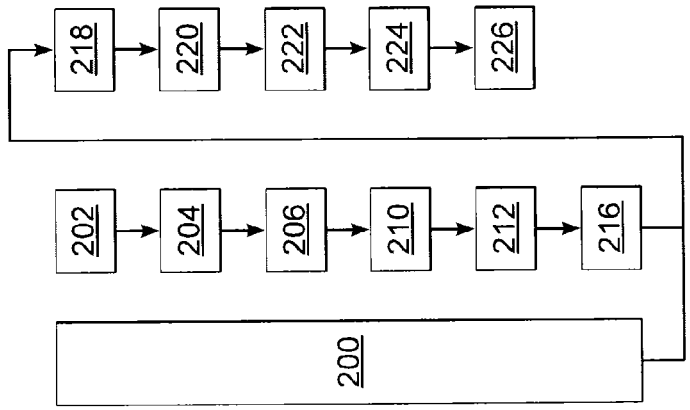
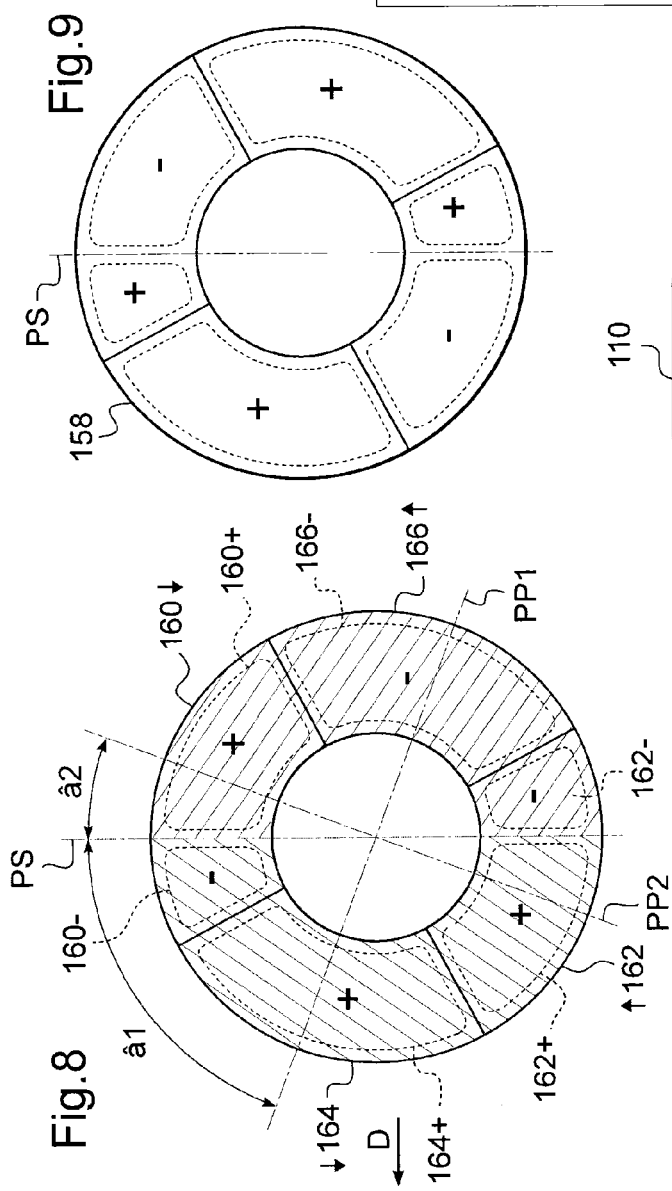
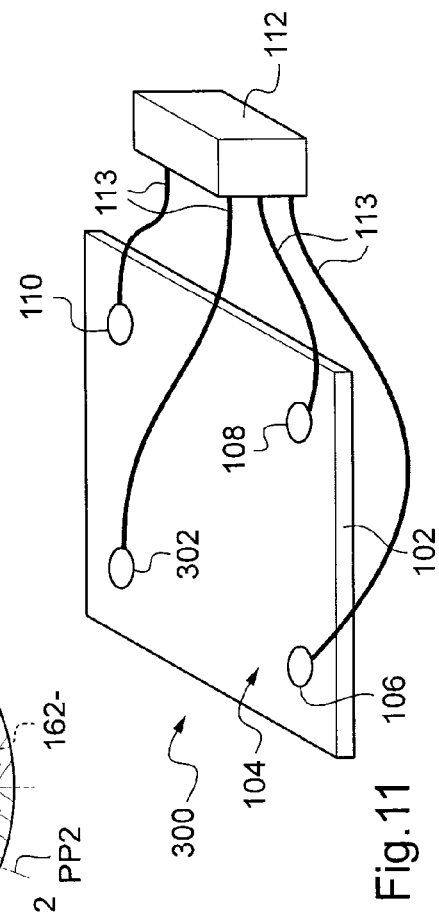

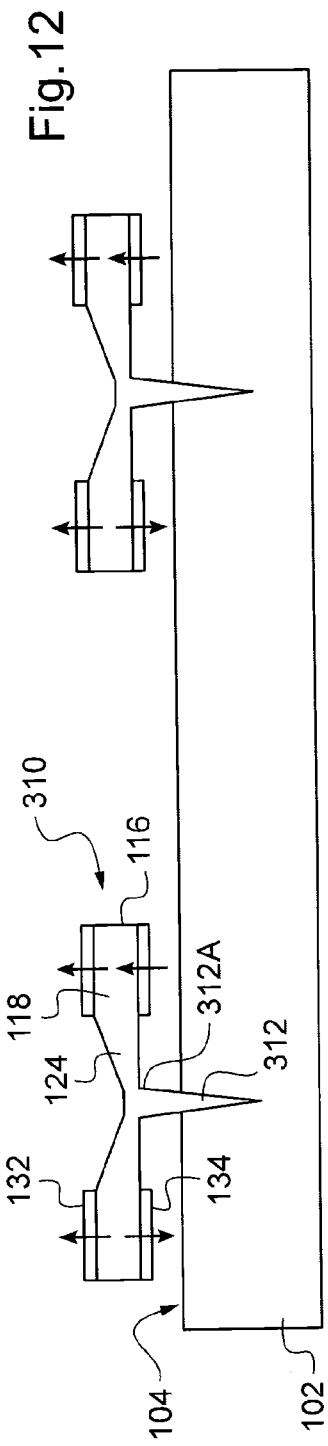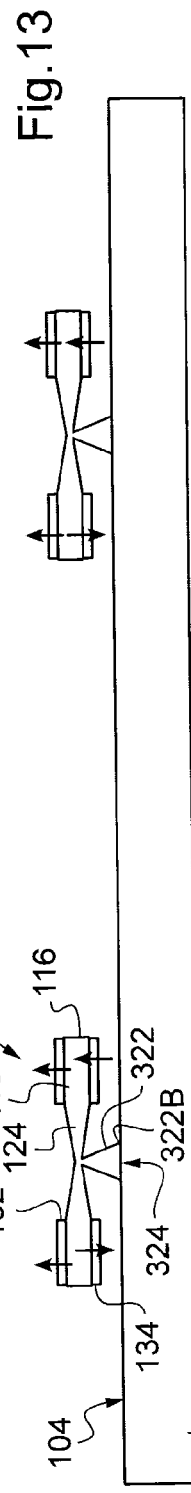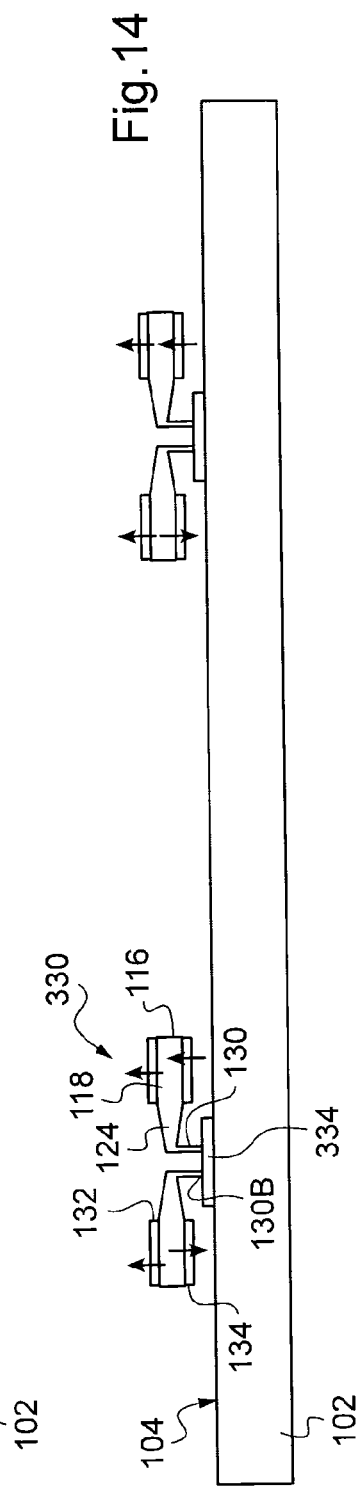

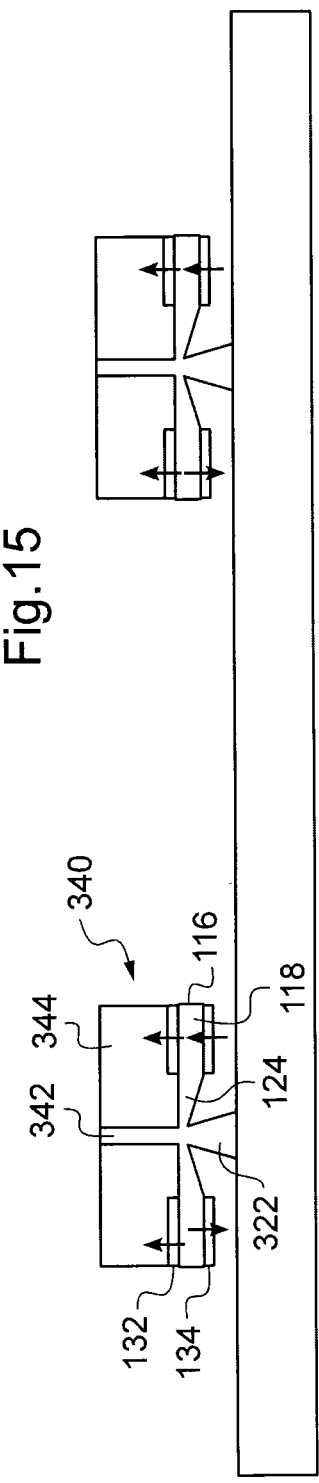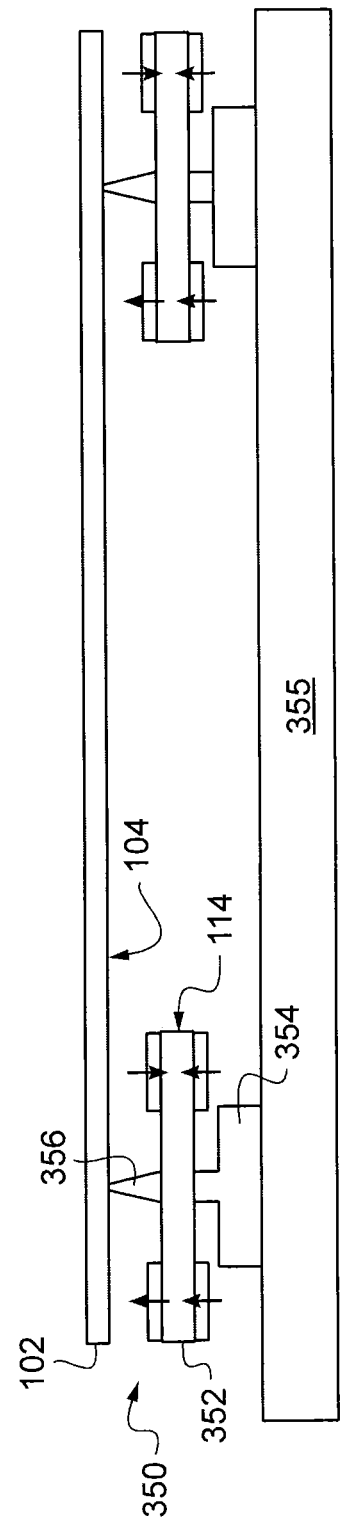

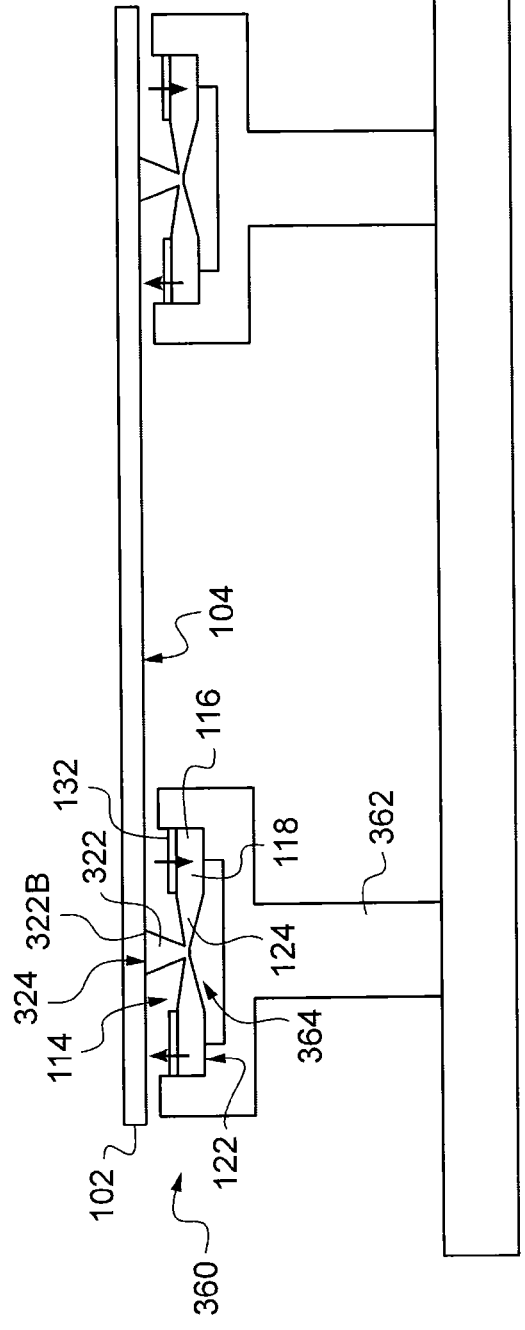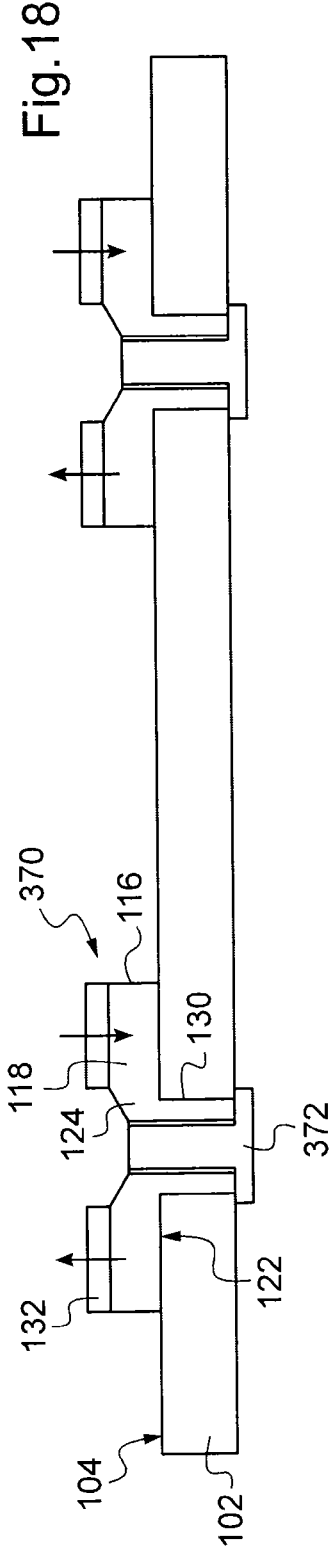

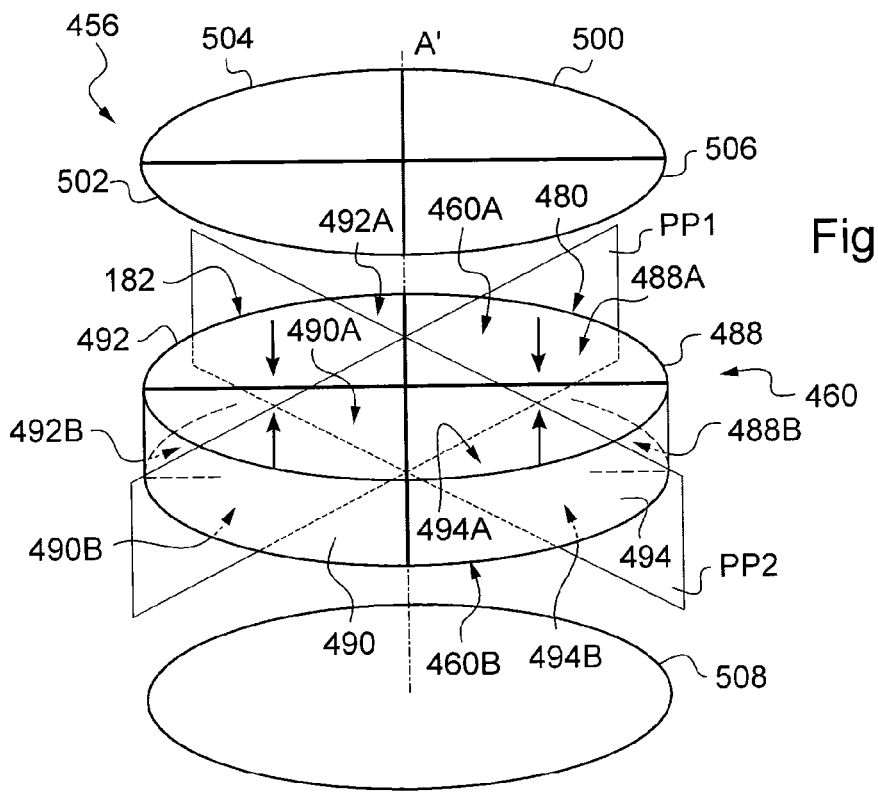
Fig.20
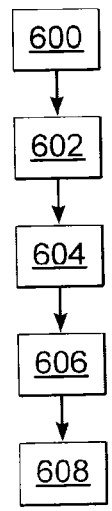
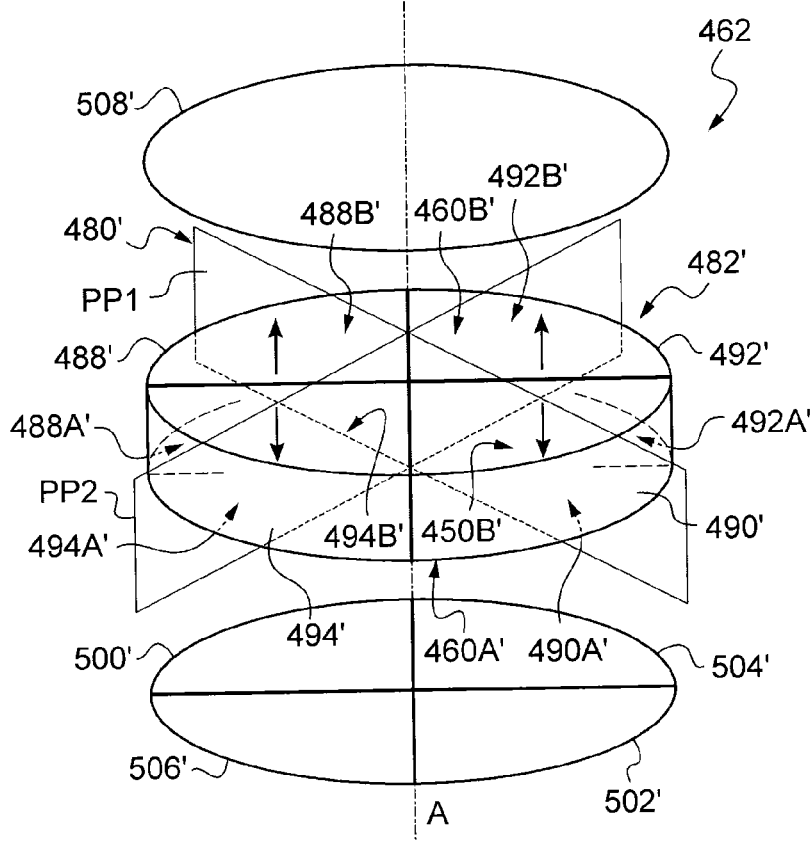
Fig.21

INTERACTIVE PANEL COMPRISING A SUBSTRATE AND AT LEAST TWO PIEZOELECTRIC TRANSDUCTION DEVICES

This invention relates to an interactive panel which comprises a substrate and at least two piezoelectric transduction devices for the detection of a seismic wave propagating in the substrate.

The invention applies more particularly to locating an impact on a substrate.

French patent application published under the number FR 2 879 885 describes the principle of locating an impact on a plate, by using the fact that this impact generates a seismic sound wave in the plate. The locating is carried out by means of a method for calculating the differential transit time between the place of impact and several pairs of devices for detecting the sound wave each comprising a piezoelectric transducer. In this document, each piezoelectric transducer is only able to supply a measurement signal that represents the intensity of the seismic wave detected, which imposes this impact locating via differential transit time. However, this type of locating has the disadvantage of depending on the propagation speed of the seismic wave, which is not always well known since it depends on the substrate wherein it is propagating.

International patent application published under number WO 2008/135846 concerns an interactive panel of the same type, comprising a substrate wherein a seismic wave can propagate and omni-directional piezoelectric transduction devices (at least three), the substrate being associated with a system for locating for the implementation of a method for locating the seismic wave via a differential transit time calculation.

Patent applications published under the numbers U.S. Pat. No. 4,268,912, JP 9 237152 and JP 10 078485 concern directional piezoelectric transduction devices, but not an interactive panel comprising a substrate and at least two piezoelectric transduction devices attached to the substrate.

As such, in order in particular to allow for other types of locating, it can be desired to provide an interactive panel comprising a substrate and at least two piezoelectric transduction devices making it possible to obtain other information on the seismic wave.

An object of the invention is therefore an interactive panel, comprising a substrate in which a seismic wave is intended to propagate according to a direction of propagation and at least two piezoelectric transduction devices, wherein:
  each piezoelectric transduction device comprises two piezoelectric transducers,
  each piezoelectric transducer comprises two piezoelectric elements each having two surfaces each covered by an electrode, an axis, referred to as central axis, being located between the two piezoelectric elements, with the four electrodes of each piezoelectric transducer being interconnected in such a way as to supply, when opposing stresses on either side of a plane, referred to as the stress-separation plane, comprising the central axis, are applied to the piezoelectric elements of this transducer, an electrical measurement signal which depends on the angle between a plane, referred to as the main plane, proper to the piezoelectric transducer and the stress-separation plane,
  the two piezoelectric transducers of the same piezoelectric transduction device have the same central axis and their respective main planes form a non-zero angle therein-between,
  each piezoelectric transduction device is attached to the substrate in such a way that the movement of the substrate during the passage of the seismic wave causes stress on the piezoelectric elements, in opposite directions on either side of the stress-separation plane, with the separation plane depending on the direction of propagation.

Thanks to the invention, it is possible to determine information concerning the angle of incidence of the seismic wave, and not only its intensity, which allows the locating to be carried out via triangulation.

Optionally, the four electrodes of each piezoelectric transducer are interconnected in the following way:
  the negative electrode of each of the two piezoelectric elements of the transducer to the positive electrode of the other of the two piezoelectric elements when the polarizations of the two piezoelectric elements are of opposite polarities, or
  the two negative electrodes between them and the two positive electrodes between them when the polarizations of the two piezoelectric elements of the transducer are of the same polarity.

Optionally also, each piezoelectric element of a piezoelectric transducer is symmetrical in relation to the main plane of this piezoelectric transducer.

Optionally also, the two piezoelectric elements of the same piezoelectric transducer are symmetrical to one another in relation to the central axis.

Optionally also, each piezoelectric element of a piezoelectric transducer has a polarisation with polarity opposite to that of the other piezoelectric element of this piezoelectric transducer.

Optionally also, the two polarizations are parallel to the central axis.

Optionally also, the polarisation of each piezoelectric element extends from one of its two electrodes, referred to as negative electrode, to the other of its two electrodes, referred to as positive electrode, and the positive electrode of each piezoelectric element of a piezoelectric transducer is connected to the negative electrode of the other piezoelectric element of this piezoelectric transducer.

Optionally also, each piezoelectric element of each piezoelectric transducer extends in an angular sector around the central axis, different from the angular sectors of the other piezoelectric elements.

Optionally also, each angular sector is an angular quarter.

Optionally also, each piezoelectric transduction device comprises a linking part comprising:
  a base to which the piezoelectric elements of this piezoelectric transduction device are attached, and
  a rod attached at one end to the base and at the other end to the substrate, extending over the central axis and intended to be moved according to a direction of movement at the passage of the seismic wave in the substrate,
with the linking part being designed to transform the movement of the rod into stresses on the piezoelectric elements, the stresses being of opposite directions on either side of the stress-separation axis comprising the central axis and perpendicular to the direction of movement.

Optionally also, the rod sinks into the substrate.

Optionally also, the rod is hollow in such a way as to have a tubular shape, in particular split in the direction of its length in order to be able to receive a screw or a cap which, when screwed or inserted by force into the rod, increases the diameter of the latter and makes it possible to obtain an intimate coupling with the substrate.

Optionally also, the two main planes are perpendicular to one another.

Optionally also, the interactive panel further comprises a system for locating, on the substrate, a seismic wave source using measurement signals from the piezoelectric transduction devices.

Figure 2:
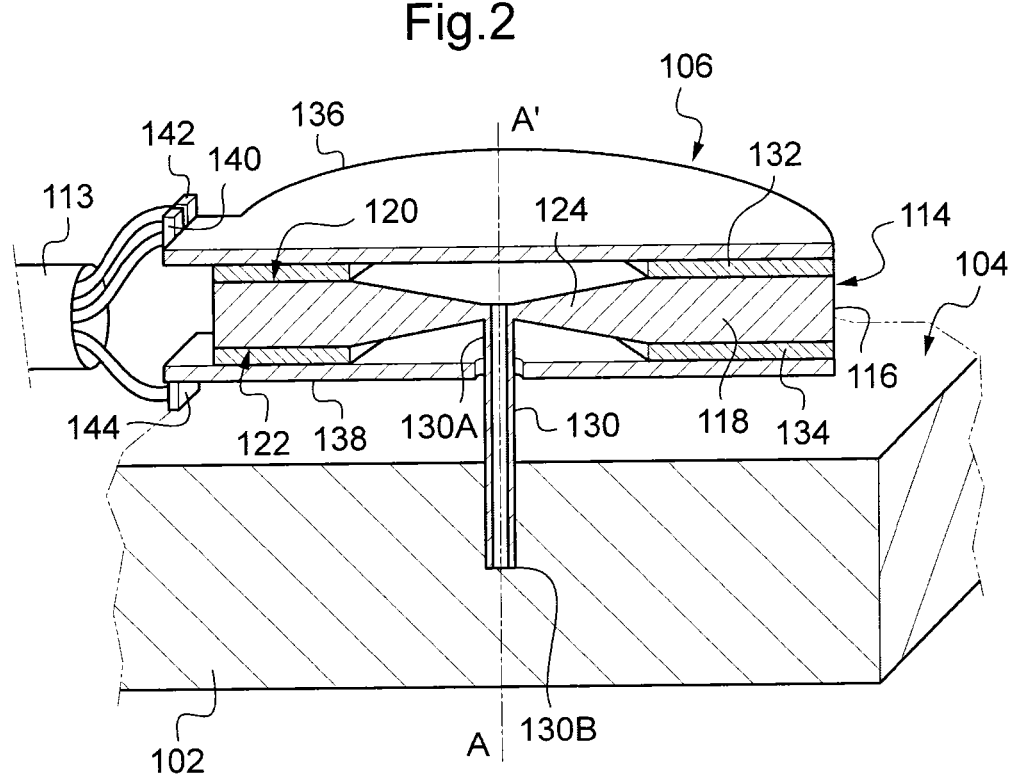
Figure 4:
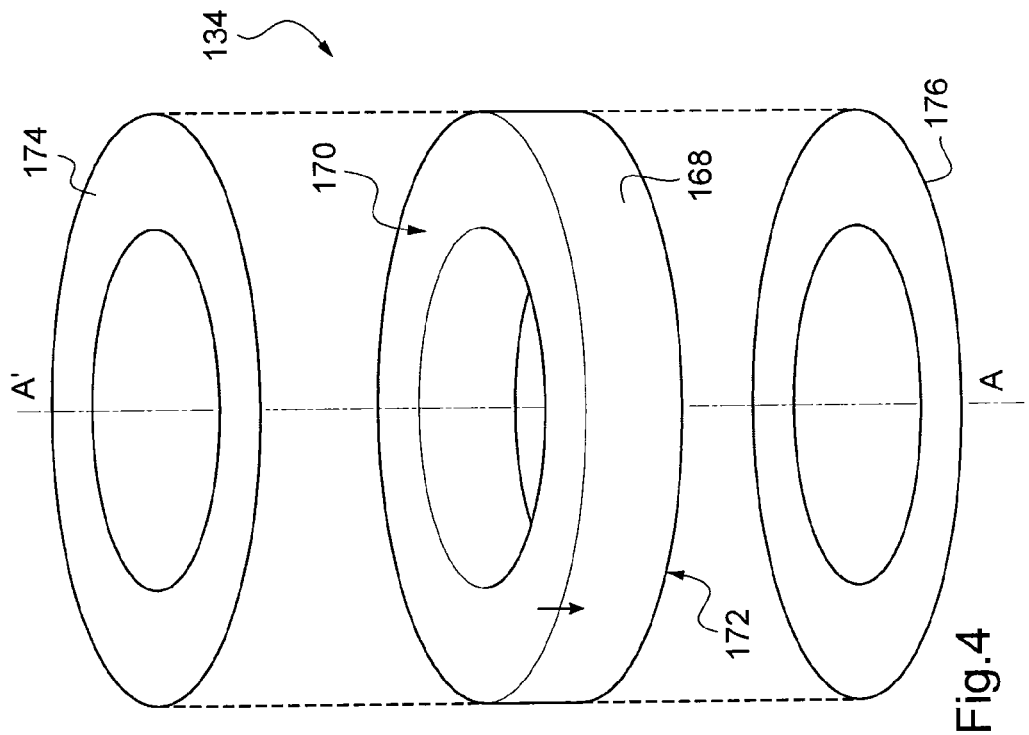
Figure 3:
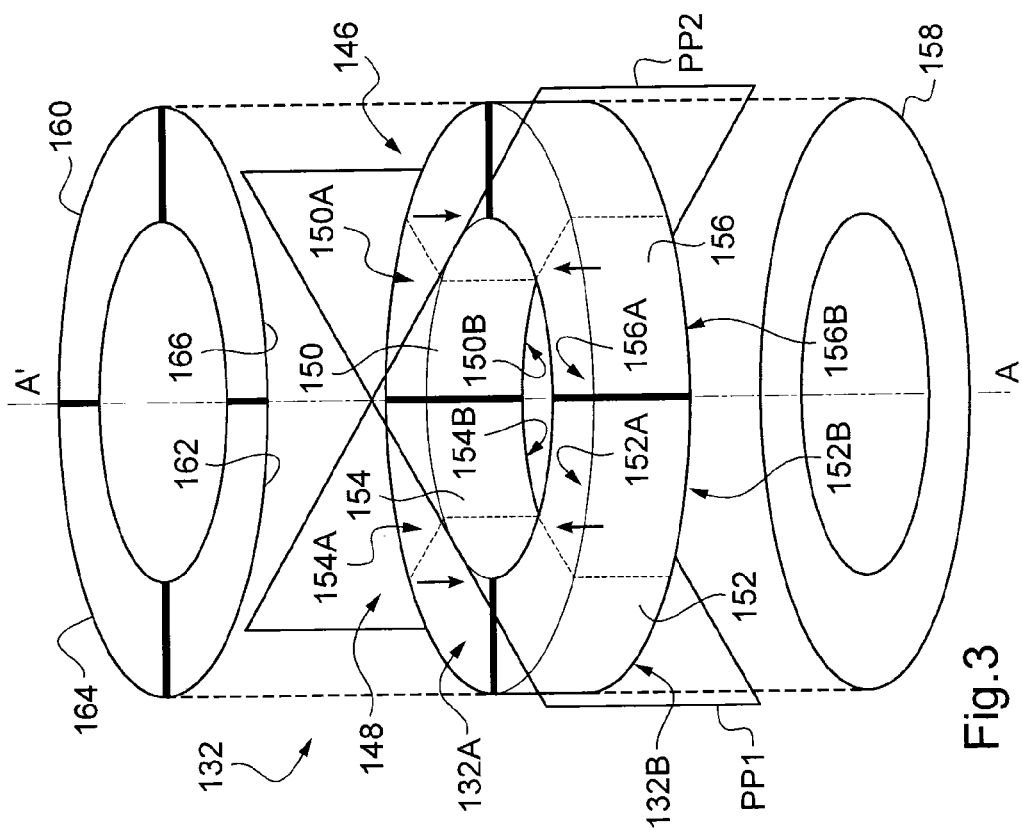
Figure 5:
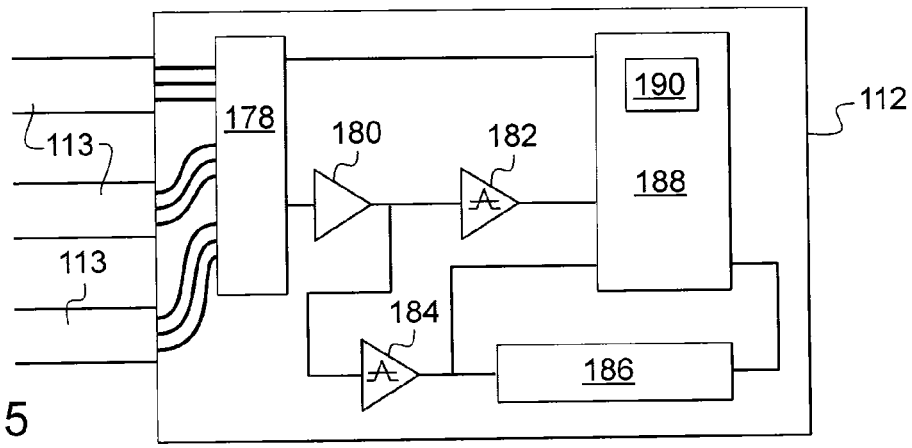
Figure 6:
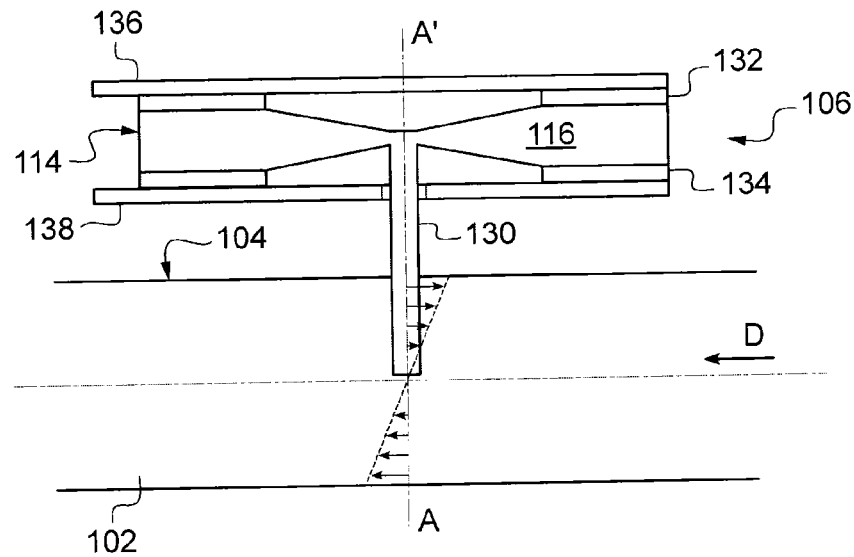
Figure 7:
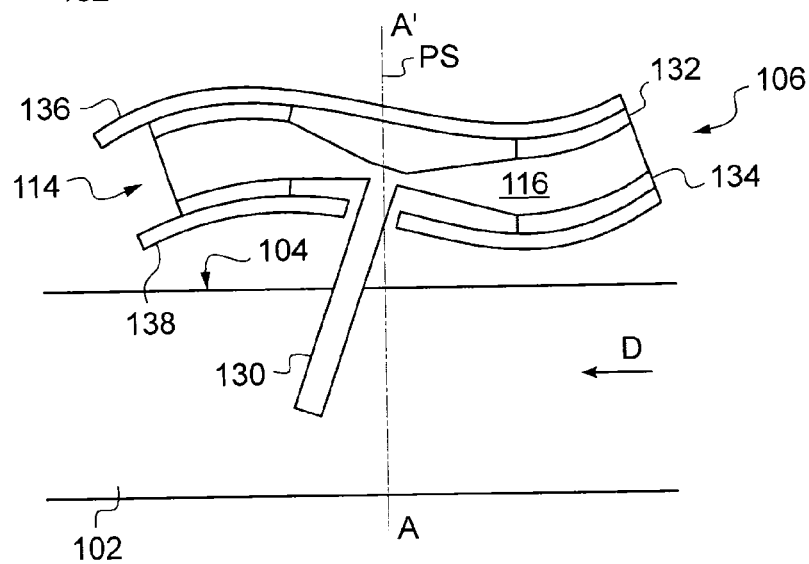
Figure 19:
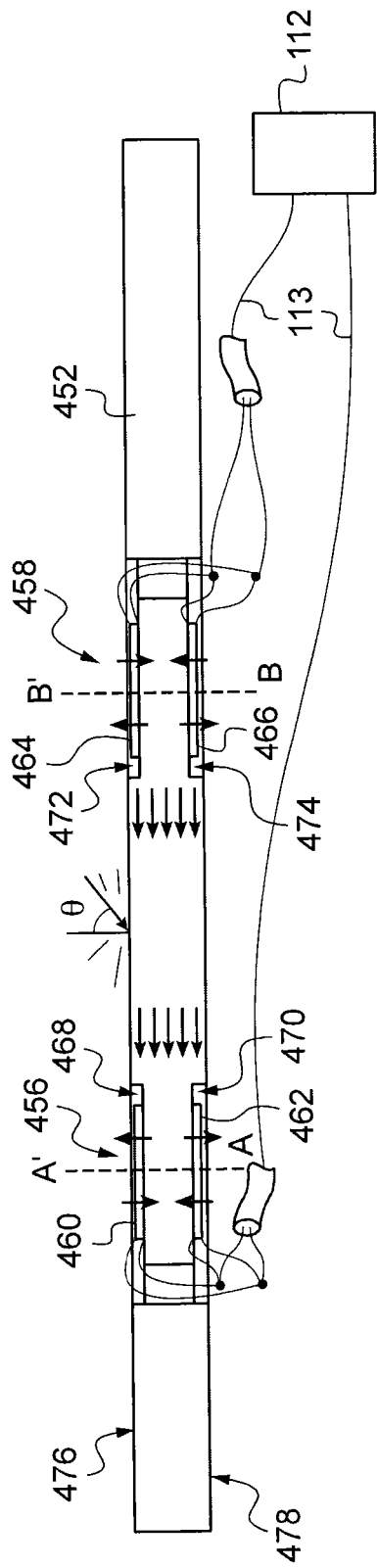

The invention shall be better understood using the following description, provided solely by way of example and in reference to the annexed drawings wherein:

FIG. 1 is a diagrammatical view in perspective of an example of an interactive panel according to the invention, FIG. 2 is a diagrammatical cross-section view in perspective of a piezoelectric transduction device of the interactive panel in FIG. 1, FIG. 3 is an exploded perspective view of a first piezoelectric ring of the device in FIG. 2, FIG. 4 is an exploded perspective view of a second piezoelectric ring of the device in FIG. 2, FIG. 5 shows a system for locating of the interactive panel in FIG. 1, FIG. 6 is a cross-section view of the device in FIG. 2 attached to a substrate wherein a seismic wave propagates, FIG. 7 is a cross-section view of the device in FIG. 6, deformed during the passage of the seismic wave, FIG. 8 is a top view of the first piezoelectric ring in FIG. 3 during the passage of the seismic wave, FIG. 9 is a top view of the second piezoelectric ring in FIG. 4 during the passage of the seismic wave, FIG. 10 is a block diagram showing the successive steps of a method for detecting and locating implemented by the interactive panel in FIG. 1, FIG. 11 is a diagrammatical view in perspective of an alternative interactive panel according to the invention, FIGS. 12 to 18 are cross-section views of alternatives of piezoelectric transduction devices according to the invention, FIG. 19 is a cross-section view of an alternative of interactive panel according to the invention, FIG. 20 is an exploded perspective view of a piezoelectric transduction device of the interactive panel in FIG. 19, and FIG. 21 is a block diagram showing the successive steps of a method for detecting and locating implemented by the interactive panel in FIG. 19.

In reference to FIG. 1, an example of an interactive panel 100 according to the invention first comprises a substrate 102, for example a slab, a floor or the ground. More preferably, the substrate 102 has a flat surface 104. More preferably also, the substrate 102 is a plate, for example made of solid wood or chipboard, or of plastic, metal, glass or concrete. The substrate 102 is intended to propagate a seismic wave, propagating at the same speed regardless of the direction of propagation on the surface of the substrate according to a direction of propagation along the flat surface 104.

The interactive panel 100 further comprises three piezoelectric transduction devices 106, 108 and 110. Each device 106, 108, 110 is attached to the substrate 102, on its flat surface 104, and is designed to supply three electrical measurement signals of the seismic wave. The devices 106, 108, 110 are arranged in an equilateral triangle, with p the midway between two devices. The origin of the axes is for example taken midway between two devices.

The interactive panel 100 further comprises a system 112 for locating, on the substrate 102, a seismic wave source using measurement signals of the devices 106, 108 and 110.

The interactive panel 100 further comprises connections 113 between the devices 106, 108, 110 and the system for locating 112 in order to transmit the measurement signals. In the example described, these connections 113 comprise coaxial cables.

The device 106 shall now be described, knowing that the other devices 108, 110 are identical.

In reference to FIG. 2, the device 106 first comprises a linking part 114, intended to connect the piezoelectric elements which shall be described further on to the substrate 102. More preferably, the linking part 114 is made of a single part and of metal, for example of aluminium or of duralumin. The linking part 114 first comprises a base 116 whereon the piezoelectric elements are attached. The base 116 is in the form of a disc with central axis AA' and comprises a circular periphery 118 provided with first and second crowns 120, 122 opposite one another according to the axis AA'. The base 116 further comprises a central portion 124 that is thinner than the periphery 118. More precisely, the periphery 118 has a constant thickness, while the central portion 124 has a thickness that decreases from the periphery 118 towards the central axis AA'. The linking part 114 further comprises a rod 130 extending according to the central axis AA' from the centre of the linking part 114. The rod 130 is intended to be placed in contact with the substrate 102. The rod 130 is provided with one end 130A attached to the base 116 and with one free end 130B, planted or embedded in the substrate 102, through its surface 104. The rod 130 is intended to be moved according to a direction of movement, perpendicular to the central axis AA', during the passage of a seismic wave in the substrate 102, as shall be explained in what follows. More preferably, when the substrate 102 has a thickness less than ten centimeters, the rod 130 sinks into the substrate 102 over half of the thickness of the latter. Otherwise, the rod 130 sinks more preferably into the substrate 102 over a depth less than the smallest half wavelength of a mode of propagation of the wave in the rod and in the substrate 102. In the example described, the rod 130 is hollow in such a way as to have a tubular shape. The interest in using a rod 130 of tubular shape is to reduce its radiation impedance, in such a way that the device 106 is adapted to the detection of high frequencies or to substrates with low intrinsic impedances, such as substrates made of plastic. More preferably, the rod 130 has an external diameter that is smaller than a half wavelength of the waves intended to propagate in the substrate 102. The rod 130 is furthermore split in the direction of its length, in order to be able to receive a screw or a cap (not shown) which, when screwed or inserted by force into the rod, increases the diameter of the latter and makes it possible to obtain an intimate coupling with the substrate 102, which is sometimes difficult to obtain with simple glue. Note that the substrate 102 can be one of the plates of a double wall or double glaze interface, with the rod 130 making it possible to access the interior and/or exterior plate of the double wall. The two walls of a double wall can be drilled and undercut in such a way that the intimate contact between the rod and the substrate is produced on the plate or on the two plates simultaneously and over the depth of interest.

The device 106 further comprises first and second piezoelectric rings 132, 134 with central axis AA', each respectively attached to the first crown 120 and the second crown 122 of the linking part 114.

The device 106 further comprises two printed circuit boards 136, 138 respectively covering the first piezoelectric ring 132 and the second piezoelectric ring 134, in such a way as to clamp them with the linking part 114. The first printed circuit board 136 comprises two connectors 140, 142 to supply respectively first and second measurement signals making it possible, as shall be explained in what follows, to detect the angle of incidence of the seismic wave, and which will therefore be called angular measurement signals in what follows. The second printed circuit board 138 comprises a connector 144 to supply a third measurement signal of a component outside the plane of the seismic wave, as shall be explained in what follows, and will therefore be called out-of-plane measurement signal in what follows. In the example described, the connectors are connectors for coaxial cables. Each printed circuit board 136, 138 further comprises conductive tracks connecting, on the one hand, the first piezoelectric ring 132 to the first and second connectors 140, 142 and, on the other hand, the second piezoelectric ring 134 to the third connector 144.

In reference to FIG. 3, the first piezoelectric ring 132 comprises two piezoelectric transducers 146, 148 each comprising two piezoelectric elements, respectively 150, 152 and 154, 156. Each piezoelectric element 150, 152, 154, 156 extends in an angular sector around the central axis AA', different from the angular sectors of the other elements. More preferably, the angular sectors do not overlap. More precisely, each piezoelectric element 150, 152, 154, 156 forms an angular sector of the first piezoelectric ring 132, in the example described an angular sector of 90°, i.e. a quarter circle. The two piezoelectric elements 150, 152 and 154, 156 of the same piezoelectric transducer 146, 148 are arranged one across from the other, in such a way as to be symmetrical to one another in relation to the central axis AA'. Furthermore, each of the two piezoelectric elements 150, 152 and 154, 156 of the same piezoelectric transducer 146, 148 has a symmetry in relation to the same plane, referred to as main plane, which comprises the central axis AA'. These planes are respectively referenced as PP1 for the two piezoelectric elements 150, 152, and PP2 for the two piezoelectric elements 154, 156. Note that the two piezoelectric transducers 146, 148 have the same central axis AA' and that their main planes PP1, PP2 form a non-zero angle thereinbetween. More preferably, they are perpendicular as in the example described. Moreover, note that the two piezoelectric transducers 146, 148 share the same linking part 114.

Each piezoelectric element 150, 152, 154, 156 has first and second surfaces opposite in relation to the central axis AA', respectively referenced as 150A, 150B, 152A, 152B, 154A, 154B, and 156A, 156B. The first surfaces 150A, 152A, 154A, 156A form a first crown 132A of the first piezoelectric ring 132, while the second surfaces 150B, 152B, 154B, 156B form a second crown 132B of the first piezoelectric ring 132.

Each first and second surface of each piezoelectric element 150, 152, 154, 156 is covered by an electrode. The electrodes covering the second surfaces 150B, 152B, 154B, 156B are all interconnected in such a way as to form a single electrode in the shape of a crown, referenced as 158, via which the first piezoelectric ring 132 is attached to the first crown of the linking part. The electrodes covering the first surfaces 150A, 152A, 154A, 156A are respectively referenced as 160, 162, 164 and 166.

Each piezoelectric element 150, 152, 154, 156 has a polarisation in the direction of the central axis AA', directed from one of its electrodes, referred to as negative electrode, to the other of its electrodes, referred to as positive electrode. The polarizations are indicated by arrows in FIG. 3. The polarizations of the two piezoelectric elements 150, 152 and 154, 156 of each piezoelectric transducer 146, 148 are of opposite polarities. As such, for the piezoelectric element 150, its second electrode 150B is the positive electrode, while its first electrode 150A is the negative electrode, and, for the element 152, its second electrode 152B is the negative electrode, while its first electrode 152A is the positive electrode. Likewise, for the piezoelectric element 154, its second electrode 154B is the positive electrode, while its first electrode 154A is the negative electrode, and, for the element 156, its second electrode 156B is the negative electrode, while its first electrode 156A is the positive electrode.

The two first electrodes 150, 152 and 154, 156 of each piezoelectric transducer 146, 148 are interconnected. As such, the two piezoelectric elements 150, 152 and 154, 156 of each piezoelectric transducer 146, 148 are mounted in parallel, with the positive electrode of a piezoelectric element being connected to the negative electrode of the other piezoelectric element.

In reference to FIG. 4, the second piezoelectric ring 134 is formed by a single annular piezoelectric element 168 having first and second crowns 170, 172. Each crown 170, 172 is covered by a respective electrode 174, 176. The annular piezoelectric element 168 has a polarisation according to the central axis AA', from the first electrode 174 to the second electrode 176. The second piezoelectric ring 134 is attached to the second crown 122 of the linking part 114 by its second crown 170.

In reference to FIG. 5, the system for locating 112 first comprises an analogue multiplexer 178 to select via control one of the measurement signals.

The system for locating 112 further comprises a wide-band amplifier 180 connected to the analogue multiplexer 178 to amplify the selected measurement signal.

The system for locating 112 further comprises a first band pass filter 182 connected to the wide-band amplifier 180 in order to filter the amplified signal. This first band pass filter 182 is for example a Delyannis filter and its bandwidth is for example centred on 26 kHz.

The system for locating 112 further comprises a second band pass filter 184 connected to the wide-band amplifier 180 to filter the amplified signal. This second band pass filter 184 is for example a Delyannis filter. More preferably, its bandwidth is centred on a frequency different from that of the first filter 182, for example 7 kHz.

The system for locating 112 further comprises a processing chain 186 connected to the second band pass filter 184 to supply a trigger signal when the filtered measurement signal has an energy higher than a predetermined threshold. This processing chain 186 comprises for example, in order, a quadrator, a peak detector, a follower circuit, an integrator and a switching transistor.

The system for locating 112 further comprises a microcontroller 188. The microcontroller 188 is first connected to the analogue multiplexer 178 in order to control the latter, in order to select the measurement signals one after the other.

The microcontroller 188 comprises a memory 190 of the FIFO type ("First In First Out"), in order to record in a rolling manner the measurement signals.

The microcontroller 188 is connected to the first band pass filter 182 to digitise and record the filtered measurement signal, when the latter is an angular measurement signal (i.e. when it controls the analogue multiplexer 178 to select an angular measurement signal).

The microcontroller 188 is furthermore connected to the second band pass filter 184 to digitise and record the filtered measurement signal, when the latter is a detection signal (i.e. when it controls the analogue multiplexer 178 to select a detection signal). The microcontroller 188 is furthermore connected to the processing chain 186 in order to collect the activity detection signal in the measurement signal, when the latter is a detection signal (i.e. when it controls the analogue multiplexer 178 to select a detection signal).

As such, the microcontroller 188 receives all of the measurement signals from devices 106, 108 and 110, in a filtered and digitised form.

The operation of devices 106, 108, 110 shall now be explained.

In reference to FIG. 6, a seismic wave generated by an impact on the substrate 102 propagates in a direction D included in the plane of FIG. 6. The seismic wave causes a local deformation of the material of the substrate 102 parallel to the substrate 102, referred to as deformation in the plane, and a local deformation of material perpendicularly to the substrate 102, referred to as out-of-plane deformation. In thin plates made from a homogeneous and isotropic material, the seismic wave is a Lamb wave and propagates substantially according to two modes of propagation: a symmetrical mode wherein the deformations are symmetrical in relation to the median plane of the substrate, and an anti-symmetrical mode wherein the deformations are anti-symmetrical in relation to the median plane of the substrate. The deformations in the plane for the anti-symmetrical mode, at the place where the rod 130 is located, are indicated in FIG. 6.

In reference to FIG. 7, these deformations cause an inclination of the rod 130, in the plane transversal to the substrate 102 and comprising the direction of propagation D, referred to as inclination plane, corresponding to the plane in FIG. 6. As such, at the passage of the seismic wave, the rod 130 is moved in the inclination plane, and in particular in the direction of propagation D.

The movement of the rod 130 causes a stress of the base 116, which is transmitted to the first and second piezoelectric rings 132, 134.

As such, the linking part 114 transforms the movement of the rod 130 into stresses on the piezoelectric elements of the first and second piezoelectric rings 132, 134. More precisely, the movement of the rod 130 creates stresses resulting respectively on either side of a plane, referred to as deformation-separation plane PS, perpendicular to the direction of movement D and comprising the central axis AA'. As such, each piezoelectric ring is subjected to one of the resulting stresses on its half located on one side of the stress-separation plane PS, and to the other one of the resulting stresses on its half located on the other side of the stress-separation plane PS. These two resulting stresses are of opposite polarities, or, in other terms, anti-symmetrical in relation to the stress-separation plane PS. Note that the stress-separation plane corresponds to the wavefront of the seismic wave.

Under the effect of the stress to which it is subjected, the polarisation of each piezoelectric element changes, causing the appearance of charges with opposite signs in each of its two electrodes.

In reference to FIG. 8, the stress-separation plane PS forms an angle â1 with the first main plane PP1 and an angle â2 with the second main plane PP2.

Due to the fact that the resulting stresses (shown by different hatched lines in the figure) are of opposite polarities on either side of the stress-separation plane PS, positive charges appear on the portions of the first electrodes located on one side of the stress-separation plane PS, while negative charges appear on the portions of the first electrodes located on the other side of this plane PS. For the same electrode, these positive and negative charges mix to give the electrode its overall charge. In FIG. 8, the positive and negative charges are shown not mixed. As such, the electrode 160 of the piezoelectric element 150 of the first piezoelectric transducer 146 comprises a portion 160+ with positive charges and a portion 160− with negative charges, while the other electrode 162 comprises a portion 162+ with positive charges and a portion 162− with negative charges. The electrode 164 of the piezoelectric element 154 of the second piezoelectric transducer 148 comprises only a portion 154+ with positive charges, while the other electrode 166 comprises only a portion 166− with negative charges.

As such, the overall charge on each electrode depends on the proportion of this electrode located on either side of the stress-separation plane and therefore on the angular position of the stress-separation plane PS. In particular, the overall charge on each electrode is minimal (in absolute value) when the portion with the positive charges is of the same size as the portion with negative charges. This occurs when the stress-separation plane PS cuts the electrode in two, i.e. when the direction of propagation D is perpendicular to the main plane of this electrode. Likewise, the overall charge of each electrode is maximal (in absolute value) when it is located entirely on one side or the other of the stress-separation plane. This occurs when the separation plane PS forms an angle greater than 45° with the main plane of this electrode (case with electrodes 164 and 166 in FIG. 8). As such, the overall charge on each electrode depends on the angle between its main plane and the stress-separation plane PS, i.e. on the angle between its main plane and the direction of propagation D of the seismic wave.

In reference to FIG. 9, wherein the stresses are not shown for reasons of clarity, the electrode 158 of the first piezoelectric ring 132 comprises a half with positive charges and a half with negative charges in such a way that the overall charge of this electrode 158 does not change much, and remains practically constant.

As such, each piezoelectric transducer 146, 148 supplies an electrical measurement signal which depends on the angle between its main plane PP1, PP2 and the direction of propagation D of the seismic wave.

In the same way as for the electrode 158, the overall charge of the two electrodes 174, and 176 remains practically constant, in such a way that the second piezoelectric ring 134 of the second piezoelectric ring 134 is hardly sensitive to the stresses in the plane of the seismic wave.

Moreover, the out-of-plane deformation of the seismic wave moves the linking part 114 parallel to the central axis AA', in such a way that the stress is uniform over each of the rings 132, 134.

As such, due to the alternating polarisation of the piezoelectric elements 150, 152, 154, 156, and their connections between them, the first piezoelectric ring 132 is hardly sensitive to the out-of-plane deformations of the seismic wave.

On the contrary, due to the fact that it is comprised only of a single piezoelectric element 170, the second piezoelectric ring 134 is sensitive to the out-of-plane stresses of the seismic wave.

In reference to FIG. 10, the operation of the interactive panel 100 shall now be described.

During a step 200, the microcontroller 188 receives the three measurement signals from each piezoelectric transduction device and records them in a rolling manner in its memory 190.

During a step 202, a seismic wave reaches the device 106 first.

During a step 204, the device 106 supplies three measurement signals corresponding to the detection of the seismic wave.

During a step 206, the energy accumulated from the out-of-plane measurement signal of the device 106 is measured by the processing chain 186.

During a step 210, the seismic wave reaches the other devices 108, 110.

During a step 212, these devices 108, 110 each supply three measurement signals corresponding to the detection of the seismic wave.

During a step 216, the accumulated energy exceeds the predetermined threshold, in such a way that the processing chain supplies a trigger signal.

During a step 218, following the reception of the trigger signal, the microcontroller 188 stops the recording of the measurement signals of devices 106, 108, 110. At this moment, the microcontroller 188 has at its disposition the beginning of all of the measurement signals corresponding to the detection of the seismic wave by the devices 106, 108, 110.

During a step 220, the microcontroller 188 determines the phase and the amplitude of the angular measurement signals of each of the devices 106, 108, 110.

During a step 222, the microcontroller 188 determines, for each device 106, 108, 110, an angle of incidence of the seismic wave on this device using the amplitudes and phases of the angular measurement signals of this device. The angle of incidence can be determined in many ways, within reach of those skilled in the art, for which details will not be provided.

During a step 224, the microcontroller 188 determines via triangulation the position of the source of the sound wave using angles determined in the previous step, with the positions of the three devices 106, 108, 110 on the substrate 102 being known to the microcontroller 188. For example, these positions are recorded in the microcontroller 188 at the time of the installation of the interactive panel 100.

In the example shown in FIG. 1, the devices 106, 108, 110 are arranged in an equilateral triangle, in such a way that the coordinates (x,y) of the source satisfy the following system of three equations, each corresponding to a determined angle:

$$\begin{cases} y = \tan\theta_1 \cdot (x + p) \\ y = \tan\theta_2 \cdot (x - p) \\ y = \tan\theta_3 \cdot (x + p\sqrt{3}) \end{cases},$$

with $\theta_1$, $\theta_2$, $\theta_3$ the determined angles and p the midway between two devices.

More preferably, the microcontroller 188 uses, to determine the coordinates (x,y), only the two equations corresponding to the two angles of which the difference in absolute value is the closest to 90°.

As a complement, the microcontroller 188 can determine, during a step 226, the position of the source of the seismic wave using the out-of-plane measurement signals, by means of a method for locating via differential transit time, known per se.

In reference to FIG. 11, an alternative interactive panel 300 according to the invention is shown. This interactive panel 300 is identical to the interactive panel 100 in FIG. 1, except in that it comprises a fourth piezoelectric transduction device 302, identical to the three others, and in that the four devices 106, 108, 110, 302 are arranged in a rectangle on the substrate 102.

In this case, the microcontroller 188 is configured to solve a system based on four equations. Here again, the microcontroller 188 is more preferably configured to use only the two equations corresponding to the two angles of which the difference in absolute value is the closest to 90° and of which the amplitudes are the highest.

Taking the amplitude into account is interesting in particular in the case where the source of the sound wave corresponds to an impact according to a very low angled direction in relation to the surface 104 of the substrate 102, since in this case the radiated sound field is preponderant in the direction of approach on the surface 104 of the substrate (i.e. the direction of propagation).

In the following figures, the printed circuit plates shall be omitted for reasons of clarity.

In reference to FIG. 12, an alternative piezoelectric transduction device 310 that can be used in the interactive panel 100 is shown. This device 310 differs primarily from the device 106 in FIG. 2 in that the rod, which here has the reference 312, is in the shape of a tip, planted in the substrate 102 through its surface 104. This device 310 is adapted in particular to outfit the ground for locating earthquakes, or to outfit the floor of buildings for the monitoring and the locating of sound sources linked to a human activity. The base diameter of the rod 312 (i.e. the diameter of its fixed end which here has the reference 312A) remains less than one half wavelength of the substrate 102.

In reference to FIG. 13, an alternative piezoelectric transduction device 320 that can be used in the interactive panel 100 is shown. This device 320 differs primarily from the device 106 in FIG. 2 in that the rod, here having the reference 322, expands towards a free expanded end 322B, delimiting a flat coupling surface 324, perpendicular to the central axis AA'. This coupling surface 324 is intended to be thrust against the surface 104 of the substrate 102. The use of this coupling surface 324 makes it possible to increase the sensitivity of the device 320. On the other hand, the device all the more so disturbs the seismic wave, in such a way that the determination of the angle of incidence can be disturbed.

In reference to FIG. 14, an alternative piezoelectric transduction device 330 that can be used in the interactive panel 100 is shown. This device 330 differs primarily from the device 106 in FIG. 2 in that it further comprises a tubular adaptor 332, with low disturbance of the seismic wave, having a flat coupling surface 334 and provided with an opening for receiving the free end 1306 of the rod 130. The coupling surface 334 is intended to be thrust against the surface 104 of the substrate. It can be maintained as such for example by gluing. The tubular adaptor 332 is for example made of elastomeric material or of a soft plastic.

In reference to FIG. 15, an alternative piezoelectric transduction device 340 that can be used in the interactive panel 100 is shown. This device 340 differs primarily from the device 320 in FIG. 13 in that the linking part 114 further comprises a second rod 342 extending along the axis AA', in the direction opposite of the first rod 322. The device 340 further comprises at least one winglet 344 extending parallel to the central axis AA' and attached to the second rod 342. More preferably the device comprises an even number of winglets 344, distributed around the second rod 342 at a constant angular step, for example perpendicular between them in the case of four winglets. The function of this or these winglets 344 is to capture the airwaves propagating in the air. The function of the second rod 342 is to transmit the airwaves collected at the base 116, with the latter transmitting them to the piezoelectric rings 132, 134. As such, this device 340 can also be used as a microphone.

In reference to FIG. 16, an alternative piezoelectric transduction device 350 that can be used in the interactive panel 100 is shown. This device 350 differs primarily from the device 100 in FIG. 2 in that the base, here having the reference 352 of the linking part 114, no longer comprises the central portion of which the thickness decreases towards the central axis AA', but has a constant thickness. Furthermore, the linking part 114 comprises a base 354 attached to the centre of the base 352, opposite the rod, and intended to rest on the floor 355. The rod, which here has the reference 356, is in the shape of a tip whereon the substrate 102 is intended to rest via its surface 104. The fact that the coupling with the substrate 102 is one-off or almost one-off limits the disturbance of the incident wavefront, in such a way that the angular selectivity is optimal. On the other hand, the sensitivity of the device 350 is low. As such, the device 350 is more preferably used when the seismic wave is strong, for example generated by a strong impact.

In reference to FIG. 17, an alternative piezoelectric transduction device 360 that can be used in the interactive panel 100 is shown. This device 360 differs in particular from the device 320 in FIG. 13 in that it does not include a second piezoelectric ring. This device 360 comprises however a leg 362 provided with an inside cavity 364 wherein the linking part 114 is arranged. The latter rests on the leg 362 via its second crown 122. The rod 322 extends in the other direction than in FIG. 13 and the substrate 102 rests on the coupling surface 324 of the free expanded end 322B of the rod 322. As for the device 320 in FIG. 13, using an extended coupling surface increases the sensitivity of the device 360.

The alternatives in FIGS. 16 and 17 are in particular adapted in the case where the substrate 102 is a plateau or a plate having a thickness less than ten centimeters, for example a glass plate that may have been tempered, be bevelled on its outside edge, etc. The invention thus makes it possible to obtain an interactive panel without having to modify the substrate. Moreover, in these alternatives, the device is more preferably arranged at a distance from the edges of the substrate 102, by at least two or three wavelengths from the edges of the substrate 102.

In reference to FIG. 18, an alternative piezoelectric transduction device 370 that can be used in the interactive panel 100 is shown. This device 370 differs primarily from the device 106 in FIG. 2 in that it does not include the second piezoelectric ring 134, the second crown 122 of the base 116 of the linking part 114 being as such directly thrust, for example glued using epoxy glue, onto the surface 104 of the substrate 102. In this alternative, the second crown 122 extends more preferably from the periphery 118 to the central portion 124 of the linking part 114, i.e. to the rod 130. In this alternative also, the rod 130 can be hollow and sink into the substrate 102 with a coupling improved using a coupling element 372 such as a screw, a cap or a unit comprised of a bit and an expansion screw. In the non-restricted example shown in FIG. 18, the coupling element 372 comprises a screw which is screwed into the interior threading of the rod 130 from the surface opposite the surface 104 of the substrate 102. This mounting optimises the sensitivity to weak interactions. II furthermore makes it possible to detect a vector signal, offset for example onto another external substrate arranged on the user side in the case where the interactive panel is with double glazing, the rod 130 passing through the internal glazing, sinking into the external glazing without necessarily passing through it and the second crown 122 being coupled via gluing to the internal glazing which guarantees the seal of the double glazing and the installation and the cabling of the transduction devices on the interior side for example of a storefront comprising a double glazing. The two internal and external glazings are then sensitised using the same transduction device.

In reference to FIG. 19, an alternative interactive panel 450 is shown.

In this alternative, the substrate, here has the reference 452, and the piezoelectric transduction devices, of which two have respectively references 456 and 458 can be seen in FIG. 19, are different from those in FIG. 1.

Indeed, each device 456, 458 comprises two identical piezoelectric discs 460, 462 and 464, 466 and with the same central axis AA', BB', and the substrate 452 comprises, for each device 456, 458, two counter-borings 468, 470 and 472, 474 located across from one another, each on a respective surface 476, 478 of the substrate 452. Each of the two counter-borings 468, 470 and 472, 474 is intended to receive one of the two piezoelectric discs 460, 462 and 464, 466 of the device 456, 458. Each device 456, 458 supplies two angular measurement signals, as shall be explained in what follows, but no out-of-plane measurement signal.

More preferably, the interactive panel 450 comprises a protective frame or a protective silicone resin (not shown) of the devices 456, 458 which covers the counter-borings 468, 470, 472, 474. More preferably, the silicone resin is transparent for the sound waves.

Moreover, the system for locating 112 is identical to that in FIG. 1, except in that it does not include the elements 184, 186 relating to the processing of out-of-plane measurement signals.

In reference to FIG. 20, the device 456 in FIG. 19 shall now be described in more detail, knowing that the others are identical.

The first piezoelectric disc 460 comprises two piezoelectric transducers 480, 482 each comprising two piezoelectric elements, respectively 488, 490 and 492, 494, identical to those in FIG. 3, except in that they form quarters of discs instead of quarters of rings.

Each piezoelectric element 488, 490 and 492, 494 has first and second surfaces opposite in relation to the central axis AA', respectively referenced as 488A, 488B, 490A, 490B and 492A, 492B, 494A, 494B. The first surfaces 488A, 490A and 492A, 494A form a first circular surface 460A, while the second surfaces 488B, 490B and 492B, 494B form a second circular surface 460B.

Each first and second surface of each piezoelectric element 488, 490 and 492, 494 is covered by an electrode. The electrodes covering the first surfaces 488A, 490A and 492A, 494A are respectively referenced as 500, 502, 504 and 506, while the electrode covering the second surfaces 488B, 490B and 492B, 494B is referenced as 508.

The second disc 462 is identical to the first disc 460, except in that it is turned over, in such a way that their two second circular surfaces are across from one another. In other terms, the two discs are symmetrical to one another in relation to substrate 452. In FIG. 20, the same references are as such used for the second disc 462 as for the first, except that they are followed by "'".

The two second circular surfaces 460B and 460B' are glued onto two respective surfaces 476, 478, in two respective counter-borings 468, 470.

The two first electrodes 500, 502 and 504, 506 of each piezoelectric transducer 480, 482 of the first disc 460 are interconnected, likewise for the second electrodes. As such, the two piezoelectric elements 480, 482 and 484, 486 of each piezoelectric transducer 460, 462 are mounted in parallel, with the electrode polarised positively by a piezoelectric element being connected to the electrode polarised negatively by the other piezoelectric element. The electrodes of the second disc 462 are interconnected in the same way.

Furthermore, the first electrodes of each transducer 480, 482 of the first disc 460 are connected to the first electrodes of the transducer 482', 480' which is symmetrical in relation to the substrate 452. The second electrodes of the two discs 460, 462 are connected in the same way. The symmetrical transducers in relation to the substrate 452 are as such connected in parallel.

The interactive panel 450 is adapted to thin plates, such as slabs for computer screens.

Due to the fact that the discs 460 and 462 are symmetrical in relation to the substrate and that their piezoelectric transducers are connected in parallel, the device 456 is hardly sensitive to the anti-symmetric seismic waves, but is very sensitive to the symmetric seismic waves.

In reference to FIG. 21, the operation of the interactive panel 450 shall now be described.

During a step 600, an impact occurs on the surface 476 of the substrate 452 and generates a seismic wave in the substrate 452. This impact forms an angle θ, referred to as the impact angle, with the surface 476.

During a step 602, the seismic wave reaches each of the devices 456, 458.

During a step 604, each device 456, 458 supplies as a response two angular measurement signals.

During a step 606, the microcontroller 188 determines the coordinates of the impact via triangulation using the angular measurement signals of devices 456, 458.

During a step 608, the microcontroller 188 determines the impact angle θ using phases of angular measurement signals. Indeed, it has been noted that the angular measurement signals of two devices are increasingly in opposition of phase as the impact angle θ increases and an inversion of phase is also produced according to whether the impact angle θ is positive or negative.

An interest in detecting the impact angle resides in the use that can be made of it in terms of tactile gestures, in particular for example for turning a page or sorting files and images on a tablet or graphics table simply by impacting the surface of the screen with the fingertip and in a low angle manner. A page can as such be turned in one direction or the other, a window can be moved, an icon, a file by an increment in the direction of the impact on the substrate (direction of the maximum intensity of the radiated sound wave). This particularity has a manifest application for browsing through a menu on an interactive restaurant table. In such an application, a menu can be projected on the interactive panel 450 forming a table, for example via video projection or by placing a display under the table. A choice can be made and the menu can be scrolled by carrying out a series of successive impacts and by possibly making use of the impact angle θ if the computer application provides for the use of this information as a means of interaction with the computer. Moreover, in simple cases, a low angle impact can also be used to activate an automatic system of the tactile switch type, in order for example to turn on or turn off or adjust the intensity of a lamp according to the direction and the angle of approach, or to raise or lower a window, according to whether the approach is done in a low angle manner and from bottom to top to raise the window or in a low angle manner and from top to bottom in order to lower the window. Moreover, the interactive panel 450 can also be used as a ping-pong table or as a training wall for tennis or golf. In this case, detecting the impact angle θ can be used in order to determine the rotation of the ball on itself.

It appears clearly that the invention makes it possible to determine, in relative homogeneous and isotropic substrates, i.e. in cases where the speed of propagation is the same in all directions, information on the wavefront, characterised by the direction of its wave vector. This direction is the angle of incidence of the seismic wave on the transducer, which makes it possible in particular to locate the source of the seismic wave via triangulation.

Note moreover that the invention is not limited to the embodiments described previously. It appears indeed to those skilled in the art that diverse modifications can be made to the embodiments described hereinabove, in light of the information which has just been disclosed.

For example, the polarisation of the two piezoelectric elements of each transducer could be of the same polarity. In this case, the four electrodes of these two elements would be connected in series.

In the following claims, the terms used must not be interpreted as limiting the claims to the embodiment exposed in this description, but must be interpreted so as to include therein all of the equivalents that the claims aim to cover due to their formulation and of which the scope is within the reach of those skilled in the art by applying general knowledge in implementing the information that has just been disclosed.

The invention claimed is:

1. An interactive panel comprising:
    a substrate wherein a seismic wave is intended to propagate according to a direction of propagation;
    at least two piezoelectric transduction devices;
    each piezoelectric transduction device comprising two piezoelectric transducers;
    each piezoelectric transducer comprising two piezoelectric elements each having two surfaces each covered by an electrode, a central axis being located between the two piezoelectric elements, with the four electrodes of each piezoelectric transducer being interconnected to supply, when opposing stresses on either side of a stress-separation plane, comprising the central axis, are applied to the piezoelectric elements of this transducer, an electrical measurement signal that depends on the angle between a main plane, proper to the piezoelectric transducer and the stress-separation plane;
    the two piezoelectric transducers of a same piezoelectric transduction device have the same central axis and their respective main planes form a non-zero angle therebetween; and
    each piezoelectric transduction device is attached to the substrate such that movement of the substrate during passage of the seismic wave causes stress on the piezoelectric elements, in opposite directions on either side of the stress-separation plane, with the separation plane depending on the direction of propagation.

2. An interactive panel according to claim 1, wherein the four electrodes of each piezoelectric transducer are interconnected such that:
    the negative electrode of each of the two piezoelectric elements of the transducer to the positive electrode of the other of the two piezoelectric elements when the polarizations of the two piezoelectric elements are of opposite polarities; or
    the two negative electrodes between them and the two positive electrodes between them when the polarizations of the two piezoelectric elements of the transducer are of the same polarity.

3. An interactive panel according to claim 1, wherein each piezoelectric element of a piezoelectric transducer is symmetrical in relation to the main plane of this piezoelectric transducer.

4. An interactive panel according to claim 1, wherein the two piezoelectric elements of the same piezoelectric transducer are symmetrical to one another in relation to the central axis.

5. An interactive panel according to claim 1, wherein each piezoelectric element of a piezoelectric transducer has a polarization with a polarity opposite to that of the other piezoelectric element of this piezoelectric transducer.

6. An interactive panel according to claim 5, wherein the two polarizations are parallel to the central axis.

7. An interactive panel according to claim 6, wherein the polarization of each piezoelectric element extends from one of its two electrodes, as a negative electrode, to the other of its two electrodes, as a positive electrode, and wherein the positive electrode of each piezoelectric element of a piezoelectric transducer is connected to the negative electrode of the other piezoelectric element of this piezoelectric transducer.

8. An interactive panel according to claim 1, wherein each piezoelectric element of each piezoelectric transducer extends in an angular sector around the central axis, different from the angular sectors of the other piezoelectric elements.

9. An interactive panel according to claim 8, wherein each angular sector is an angular quarter.

10. An interactive panel according to claim 1, wherein each piezoelectric transduction device comprises a linking part comprising:
   a base to which the piezoelectric elements of this piezoelectric transduction device are attached; and
   a rod attached at one end to the base and at the other end to the substrate, extending over the central axis and configured to be moved according to a direction of movement at the passage of the seismic wave in the substrate, with the linking part being configured to transform the movement of the rod into stresses on the piezoelectric elements, the stresses being of opposite directions on either side of the stress-separation axis comprising the central axis and perpendicular to the direction of movement.

11. An interactive panel according to claim 10, wherein the rod sinks into the substrate.

12. An interactive panel according to claim 11, wherein the rod is hollow so as to have a tubular shape, or split in a direction of its length to be configured to receive a screw or a cap which, when screwed or inserted by force into the rod, increases the diameter of the rod and makes it possible to obtain an intimate coupling with the substrate.

13. An interactive panel according to claim 1, wherein the two main planes are perpendicular to one another.

14. An interactive panel according to claim 1, further comprising a system for locating, on the substrate, a seismic wave source using measurement signals from the piezoelectric transduction devices.

* * * * *